US012783184B2

(12) United States Patent
Tamura

(10) Patent No.: US 12,783,184 B2
(45) Date of Patent: Nov. 3, 2026

(54) INFORMATION PROCESSING DEVICE FOR ANALYZING USER PERFORMANCE OF PROCEDURAL TASK BASED ON SENSOR LOG DATA, ANALYSIS METHOD, AND PROGRAM

(71) Applicant: Daigo Tamura, Kanagawa (JP)

(72) Inventor: Daigo Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 18/663,630

(22) Filed: May 14, 2024

(65) Prior Publication Data

US 2024/0385783 A1 Nov. 21, 2024

(30) Foreign Application Priority Data

May 17, 2023 (JP) ................................ 2023-081543

(51) Int. Cl.
*G06F 3/12* (2006.01)
*G06K 15/00* (2006.01)

(52) U.S. Cl.
CPC ............ *G06F 3/121* (2013.01); *G06F 3/1234* (2013.01); *G06F 3/1273* (2013.01); *G06K 15/4085* (2013.01); *G06F 3/1288* (2013.01)

(58) Field of Classification Search
CPC ...... G06F 3/121; G06F 3/1234; G06F 3/1273; G06F 3/1288; G06K 15/4085
USPC ........................................................ 358/1.14
See application file for complete search history.

(56) References Cited

U.S. PATENT DOCUMENTS

| | | | | |
|---|---|---|---|---|
| 2006/0012823 | A1* | 1/2006 | Fukuda | H04N 1/00344 358/1.15 |
| 2009/0222403 | A1* | 9/2009 | Kato | G06F 3/1209 |
| 2022/0012157 | A1 | 1/2022 | Ankur | |
| 2022/0155984 | A1 | 5/2022 | Shibata | |
| 2022/0283761 | A1* | 9/2022 | Shrestha | G06F 3/1292 |

FOREIGN PATENT DOCUMENTS

| | | |
|---|---|---|
| JP | 2005-156908 | 6/2005 |
| JP | 2017-154319 | 9/2017 |
| JP | 6566913 | 8/2019 |
| JP | 2021-120845 | 8/2021 |
| JP | 2022-015778 | 1/2022 |

* cited by examiner

*Primary Examiner* — Jacky X Zheng
(74) *Attorney, Agent, or Firm* — IPUSA, PLLC

(57) ABSTRACT

An information processing device is provided. The information processing device 20 includes a receiving part 452 configured to receive: paper jam occurrence information about a paper jam that has occurred in an image forming device 30; and sensor output log data associated with one or a plurality of sensors provided in the image forming device 30 to detect paper jam removal tasks performed in response to occurrence of the paper jam. The information processing device 20 includes a memory part configured to store procedural task data 354, in which one or a plurality of procedural tasks for removing the paper jam are described. The information processing device 20 includes an output control part 460 configured to output a task analysis result obtained based on: the procedural task data associated with the paper jam occurrence information; and the sensor output log data.

8 Claims, 15 Drawing Sheets

FIG.10A

| TASK | TASK LOG | TASK RESULT | TIME ELAPSED (SECONDS) |
|---|---|---|---|
| 1. OPEN RIGHT COVER | RIGHT COVER OPEN/CLOSE SENSOR ON (OFF→ON) | ○ | 0 |
| 2. OPEN TRAY | TRAY OPEN/CLOSE SENSOR ON (OFF→ON) | ○ | 10 |
| 3. OPEN TRANSFER COVER | FRONT COVER OPEN/CLOSE SENSOR ON (OFF→ON) | × | 20 |
| 3. OPEN TRANSFER COVER | TRANSFER COVER OPEN/CLOSE SENSOR ON (OFF→ON) | ○ | 30 |
| 4. REMOVE PAPER FROM TRANSPORT PATH | TRANSPORT PATH PAPER DETECTION SENSOR OFF (ON→OFF) | ○ | 120 |
| 5. CLOSE TRANSFER COVER | TRANSFER COVER OPEN/CLOSE SENSOR OFF (ON→OFF) | ○ | 130 |
| 6. CLOSE TRAY | TRAY OPEN/CLOSE SENSOR OFF (ON→OFF) | ○ | 135 |
| 7. CLOSE RIGHT COVER | RIGHT COVER OPEN/CLOSE SENSOR OFF (ON→OFF) | ○ | 140 |
| 8. RE-PRINT (SCREEN OPERATION) | PRESS START KEY (SCREEN OPERATION) | ○ | 150 |

FIG.10B

| PAPER JAM CODE | DATE/TIME OF OCCURRENCE | SETTING: TRAY | SETTING: PAPER SIZE | SETTING: SIDE TO PRINT | … |
|---|---|---|---|---|---|
| A | 202X/X/1 10:00 | TRAY2 | A3 | DOUBLE-SIDED | |
| A | 202X/X/6 14:00 | TRAY2 | A3 | SINGLE-SIDED | |
| C | 202X/X/10 12:30 | TRAY1 | A4 | SINGLE-SIDED | |
| D | 202X/X/12 16:50 | TRAY1 | A4 | DOUBLE-SIDED | |
| C | 202X/X/13 18:00 | TRAY2 | A3 | DOUBLE-SIDED | |
| F | 202X/X/17 9:30 | TRAY2 | A3 | SINGLE-SIDED | |

INFORMATION PROCESSING DEVICE FOR ANALYZING USER PERFORMANCE OF PROCEDURAL TASK BASED ON SENSOR LOG DATA, ANALYSIS METHOD, AND PROGRAM

CROSS-REFERENCE TO RELATED APPLICATIONS

This application is based on and claims priority to Japanese Patent Application No. 2023-081543, filed on May 17, 2023, the entire contents of which are incorporated herein by reference.

BACKGROUND OF THE INVENTION

1. Field of the Invention

The present invention relates to information processing. More particularly, the present invention relates to an information processing device, an analysis system, an image forming device, an analysis method, and a program.

2. Description of the Related Art

When a paper jam occurs in an existing image forming device, the location where the paper jam occurred is identified based on values collected from transport sensors and other sensors, and procedural tasks for removal of paper jam that are applicable to the location where the paper jam occurred are displayed on an operating panel. However, the operator of the image forming device might not always follow the procedural tasks for removal of paper jam as presented. Thus, there is a demand to know why the operator does not follow the procedural tasks for removal of paper jam as presented, so that the tasks for removal of paper jam may be improved based on this.

Assuming that an image forming apparatus is provided that performs a variety of operations, patent document 1 discloses a technique that is directed to finding, with ease, points among these operations where improvement is needed. According to the existing technique of patent document 1, an operational characteristics acquisition device includes: an acquirer that acquires an operation log of an image forming apparatus; and an analyzer that analyzes the acquired operation log so as to generate operational characteristics data concerning appearance of an inefficient operation. However, according to the existing technique of patent document 1, although inefficient operations in screen operations can be analyzed from the operation log of the operating panel, inefficient operations related to paper jam clearance cannot be analyzed, and inefficient operations in paper jam clearance operations cannot be identified.

SUMMARY OF THE INVENTION

Technical Problem

The present disclosure has been prepared in view of the foregoing, and aims to provide an information processing device that can analyze the tasks that the operator of an image forming device performs to remove paper jam in an image forming device.

Solution to Problem

In order to achieve the above aim, the present disclosure provides an information processing device having the following characteristics. The information processing device includes a receiving part configured to receive: paper jam occurrence information about a paper jam that has occurred in an image forming device; and sensor output log data associated with one or a plurality of sensors provided in the image forming device to detect paper jam removal tasks performed in response to occurrence of the paper jam. The information processing device includes a memory part configured to store procedural task data, in which one or a plurality of procedural tasks for removing the paper jam are described. The information processing device 20 includes an output control part configured to output a task analysis result obtained based on: the procedural task data associated with the paper jam occurrence information; and the sensor output log data.

Advantageous Effects of the Invention

Structured thus, it is possible to analyze the tasks that the operator performs when removing a paper jam in the image forming device.

BRIEF DESCRIPTION OF THE DRAWINGS

FIG. 10A is a diagram that illustrates a structure of data that the analysis server according to an embodiment generates;

FIG. 10B is a diagram that illustrates a structure of data that the analysis server according to an embodiment generates;

DETAILED DESCRIPTION OF THE PREFERRED EMBODIMENTS

Hereinafter, embodiments of the present invention will be described in detail with reference to the accompanying drawings, but the present invention is by no means limited to the embodiments described below. Note that a variety of changes and improvements may be applied to the embodiments according to the present disclosure.

Hereinafter, embodiments of the present invention will be described in greater detail with reference to the accompanying drawings, using a device usage information analysis system including an image forming device and an analysis server as an example. However, the device usage information analysis system to according the following embodiments is by no means limiting.

Figure 1:
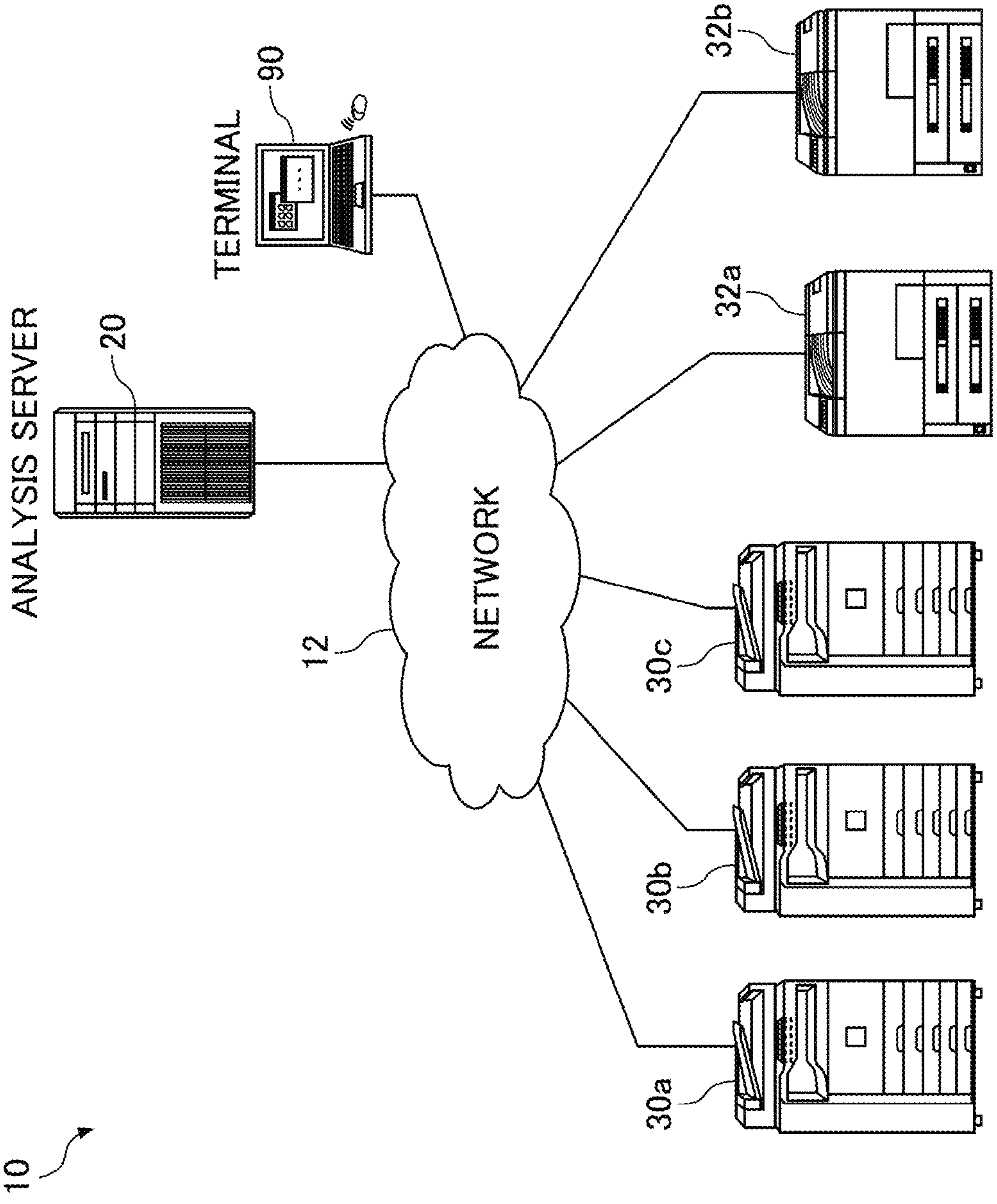
FIG. 1 is a diagram that illustrates an overall structure of a device usage information analysis system according to an embodiment of the present invention.

FIG. 1 is a diagram that illustrates an overall structure of a device usage information analysis system 10 according to the present embodiment. As illustrated in FIG. 1, the device usage information analysis system 10 includes: an analysis server 20 that analyzes information about the use of image forming devices such as multi-function devices and printers connected to a network 12; one or multiple multi-function devices 30*a* to 30*c* (three multi-function devices are illustrated in FIG. 1), which are the image forming devices subject to analysis; one or multiple printers 32*a* to 32*b* (two printers are illustrated in FIG. 1), which are also subject to analysis; and a terminal 90 that is operated by the user (analyst) of the device usage information analysis system 10 according to the present embodiment.

The analysis server 20 is deployed in the form of a server or personal computer on a cloud infrastructure or on a network within an organization such as a company, or in the form of a virtual machine on an infrastructure. The analysis server 20 collects, from the image forming devices subject to analysis (one or multiple multi-function devices 30 and one or multiple printers 32), device type identification information that identifies each device's model, and usage information about the use of each device. In particular, the analysis server 20 according to the embodiment described below collects information about the tasks that the user (or the operator) of an image forming device performs for removal of paper jam when a paper jam occurs in the image forming device. The analysis server 20 aggregates the data received from the image forming devices (one or multiple multi-function devices 30 and one or multiple printers 32) subject to analysis, analyzes the status of jobs when the paper jam occurred, and generates analysis results. Here, "removal of paper jam" refers to the act of removing jammed paper or sheet. The analysis server 20 constitutes the information processing device of the present embodiment.

The terminal 90 is a terminal that the user, who is also the analyst, uses such as a personal computer, tablet computer, smartphone, and so forth. The analyst can access the analysis server 20 by operating the terminal 90 and perform a variety of operations, including configuring various settings for analysis, giving instructions to execute analysis, giving instructions to view the result of analysis, and so forth. The terminal 90 can receive the data of the result of analysis from the analysis server 20 and display it on a screen of the terminal 90. Note that, although the following embodiment will be described assuming that the analyst accesses the analysis server 20 through the terminal 90, the embodiment is not particularly limited to this. The analysis server 20 may be equipped with a display, and the analyst may give instructions to execute analysis and view the result of analysis, by directly using the analysis server 20.

The multi-function devices 30 and printers 32 are devices subject to analysis, and are examples of image forming devices according to the present embodiment. The multi-function devices 30 and printers 32 are all equipped with one or multiple sensors for detecting the tasks that the operator performs to remove paper jam in the event a paper jam occurs. When a paper jam occurs in a multi-function device 30 or a printer 32, the multi-function device 30 or the printer 32 saves data based on outputs of one or multiple sensors (sensor output log data), collected with regard to the paper jam that occurred, from the time the paper jam occurred until it is cleared, and sends the data to the analysis server 20 in a timely manner.

Although FIG. 1 shows both the multi-function devices 30 and the printers 32, either the multi-function devices 30 or the printers 32 alone may be subject to analysis, or only specific types of multi-function devices 30 and printers 32 may be subject to analysis. Also, although FIG. 1 shows a specific number of multi-function devices 30 and printers 32, the number of multi-function devices 30 and printers 32 to analyze is not specified. For example, assuming that a manufacturer wants to analyze information about the use of devices that the manufacturer has made, a desired number devices such as, for example, multi-function devices 30 or printers 32 that are manufactured by the manufacturer and provided to users by way of sales, and in which settings for accepting data transmitted for use in analysis are configured, may be subjected to analysis. Also, the devices to be analyzed are by no means limited to image forming devices such as multi-function devices or printers, and any devices, including ones without an engine part for image formation, may be used as long as they contribute formation of images. For example, an image forming device that serves as a device subject to analysis may be a post-processing device that performs processing such as stapling paper on which an image has been formed, a pre-processing device that performs processing such as applying processing liquid to paper before an image is formed thereon, a paper feeding device that loads or feeds paper, and so forth.

The network 12 may include a local area network (LAN), a wide area network (WAN), a public line network such as the Internet, a mobile communication network such as 4G or 5G, wireless communication for drones, or a combination of these. For example, in the event a manufacturer wants to analyze information about the use of devices that the manufacturer has made, the network 12 may include the manufacturer's network, the Internet, and the network in which the equipment is installed.

Hereinafter, before the device usage information analysis system 10 according to the present embodiment is described in detail, the hardware structure of each device constituting the system 10 will be explained.

Figure 2:
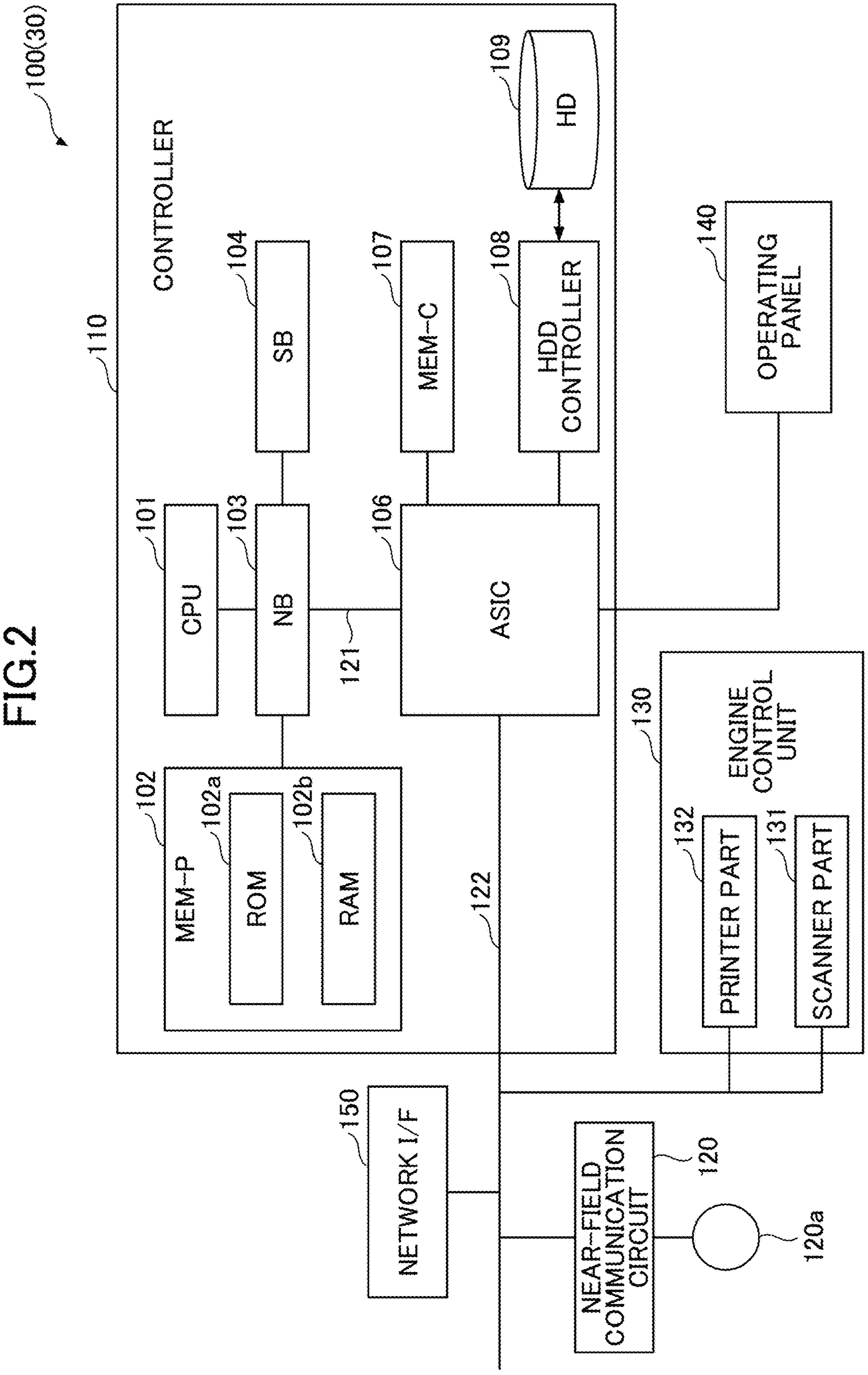
FIG. 2 illustrates a hardware structure of a multi-function device as an example of an image forming device to be analyzed, according to an embodiment.

FIG. 2 is a hardware structure diagram of a multi-function device, which is an example of an image forming device subject to analysis, according to the present embodiment. As illustrated in FIG. 2, the multi-function device ("MFP," "multifunction peripheral/product/printer," etc.) 100 (30)

includes a controller 110, a near-field communication circuit 120, an engine control part 130, an operating panel 140, and a network I/F 150.

Among these, the controller 110 includes: a CPU 101, a system memory (MEM-P) 102, a north bridge (NB) 103, a south bridge (SB) 104, and an application-specific integrated circuit (ASIC) 106, which are principal parts of a computer; and a local memory (MEM-C) 107, an HDD controller 108, and an HDD 109, which are memory parts, and structured such that an accelerated graphics port (AGP) bus 121 connects between the NB 103 and the ASIC 106.

Among these, the CPU 101 is a control part that has control over the entire multi-function device 30. The NB 103 is a bridge for connecting the CPU 101 with the MEM-P 102, the SB 104, and the AGP bus 121, and has a memory controller that controls reading and writing from and to the MEM-P 102, a peripheral component interconnect (PCI) master, and an AGP target.

The MEM-P 102 consists of a ROM 102*a*, which is a memory for storing programs and data that implement the functions of the controller 110, and a RAM 102*b*, which is used as memory for loading programs and data, a graphics memory for memory printing, and the like. Note that the programs stored in the RAM 102*b* may be provided as installable or executable files recorded on a computer-readable recording medium such as a CD-ROM, CD-R, or DVD.

The SB 104 is a bridge for connecting the NB 103 with PCI devices and peripheral devices. The ASIC 106 is an integrated circuit (IC) for image processing that includes hardware elements for image processing, and functions as a bridge that connects the AGP bus 121, a PCI bus 122, the HDD 109, and a MEM-C 107. This ASIC 106 consists of: a PCI target and an AGP master; an arbiter (ARB), which is the core of the ASIC 106; a memory controller that controls the MEM-C 107; multiple direct memory access controllers (DMACs) that rotate image data using hardware logic and the like; and a PCI unit that transfers data between a scanner part 131 and a printer part 132 via the PCI bus 122. A universal serial (USB) interface and/or an IEEE 1394 (Institute of Electrical and Electronics Engineers 1394) interface may be connected to the ASIC 106.

The MEM-C 107 is a local memory used as an image buffer for copying and a code buffer. The HDD 109 is a storage for storing image data, font data used for printing, and forms. The HDD controller 108 controls reading and writing of data from and to the HDD 109 under the control of the CPU 101. The AGP bus 121 is a bus interface for a graphics accelerator card proposed to speed up graphics processing. The AGP bus 121 is allowed direct access to the MEM-P 102 at high throughput, thereby increasing the speed of the graphics accelerator card.

Also, the near-field communication circuit 120 has a near-field communication circuit 120*a*. The near-field communication circuit 120 is, for example, a communication circuit for NFC or Bluetooth (registered trademark).

Furthermore, the engine control part 130 includes the scanner part 131 and the printer part 132. The operating panel 140 includes a panel display part 140*a* such as a touch panel that displays, for example, current setting values, a selection screen, and so forth, and receives inputs from the user, and a panel 140*b* including a numeric keypad for receiving setting values of conditions related to image formation such as density settings and a start key for receiving a copy start instruction. In the multi-function device 30 according to present the embodiment, the operating panel 140 constitutes an output device for outputting guidance including instructions for paper jam removal tasks in response to the occurrence of a paper jam. To be more specific, the operating panel 140 constitutes a display device for displaying guidance. The controller 110 controls the entire multi-function device 30, and controls, for example, graphics, communications, and inputs from the operating panel 140. The scanner part 131 and the printer part 132 includes an image processing part for error diffusion, gamma conversion, and so forth.

Note that an application switching key of the operating panel 140 enables the user to sequentially switch and select a document box function, a copy function, a printer function, and a facsimile function of the multi-function device 30. The multi-function device 30 transitions to a document box mode when the document box function is selected, to a copy mode when the copy function is selected, to a printer mode when the printer function is selected, and to a facsimile mode when the facsimile function is selected.

The network I/F 150 is an interface for data communications using the communication network. The near-field communication circuit 120 and the network I/F 150 are electrically connected to the ASIC 106 via the PCI bus 122.

Note that the hardware structure illustrated in FIG. 2 is an example, and some of the components illustrated in FIG. 2 may be omitted, or components other than those illustrated in FIG. 2 may be included. For example, the network I/F 150 may be a network interface card for a wired LAN (local area network) or a network adapter for a wireless LAN, or may be configured to communicate with other devices using Bluetooth (registered trademark), for example.

The scanner part 131 may include, for example, a document glass and an automatic document feeding device, and may have a sensor for detecting document size. The structure of the printer part 132 is not particularly limited either, and any type of printer such as an electrophotographic printer or an inkjet printer may be used.

Also, although the hardware structure of the multi-function device 30 has been described, a similar or the same hardware structure can be applied to the printer 32 by adding or removing components as appropriate (for example, the scanner part may be removed).

Figure 3:
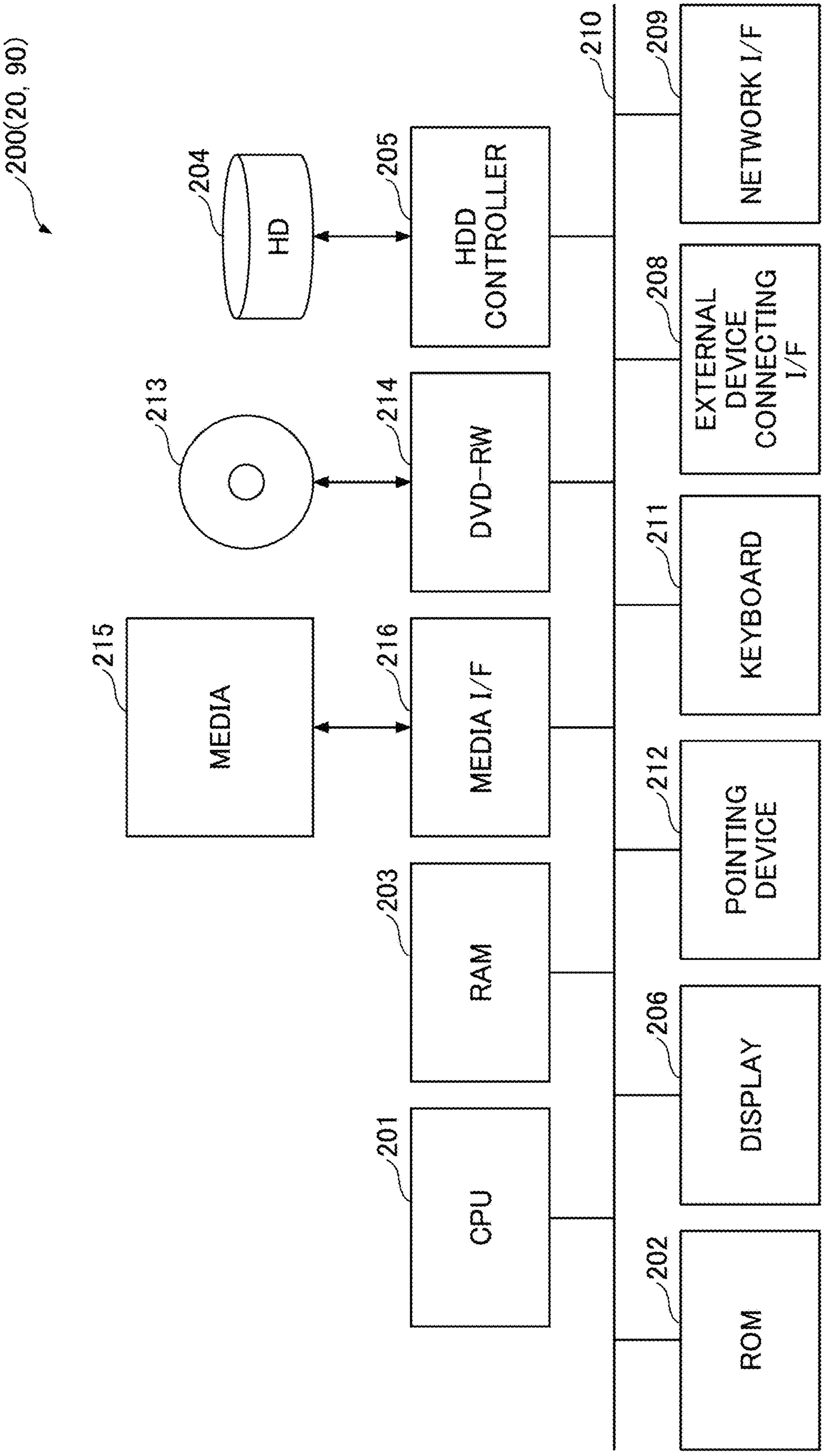
FIG. 3 is a hardware structure diagram of a computer that can be used as an analysis server or a terminal that constitutes a device usage information analysis system according to an embodiment.

FIG. 3 is a hardware structure diagram of a computer that can be used as an analysis server 20 and a terminal 90 that constitute the device usage information analysis system 10 according to the present embodiment. FIG. 3 is a diagram of the hardware structure of the computer. Here, the hardware structure of the computer 200 will be described.

As illustrated in FIG. 3, the computer 200 includes a CPU 201, a read-only memory (ROM) 202, a random access memory (RAM) 203, HDD 204, hard disk drive (HDD) controller 205, display 206, external device connecting interface (I/F) 208, a network I/F 209, a data bus 210, a keyboard 211, a pointing device 212, a digital versatile disk rewritable (DVD-RW) drive 214, and a media I/F 216.

Among these, the CPU 201 controls operations of the entire computer 200. The ROM 202 stores a program such as an initial program loader (IPL) for driving the CPU 201. The RAM 203 is used as a work area for the CPU 201. The HDD 204 stores various data such as programs. The HDD controller 205 controls reading and writing of various data from and to the HDD 204 under the control of the CPU 201. The display 206 displays various information such as a cursor, menus, windows, characters, and images. The external device connecting I/F 208 is an interface for connecting various external devices. Examples of external devices in this case include a universal serial bus (USB) memory, a printer, and so forth. The network I/F 209 is an interface for data communication using a communication network. The data bus 210 is, for example, an address b bus or a data bus for electrically connecting components such as the CPU 201 illustrated in FIG. 3 with each other.

The keyboard 211 is an example of an input means having multiple keys for entering characters, numerical values, and various instructions. The pointing device 212 is an example of an input unit for selecting and executing various instructions, selecting an object, and moving a cursor. The DVD-RW drive 214 controls reading and writing of various types of data from and to a DVD-RW 213, which is an example of a removable recording medium. Note that the DVD-RW drive 214 may support not only a DVD-RW but may also support other recording media such as a DVD-R, and no particular limitation applies. The media I/F 216 controls reading and writing (storing) of data from and to a recording medium 215 such as a flash memory.

Figure 4:
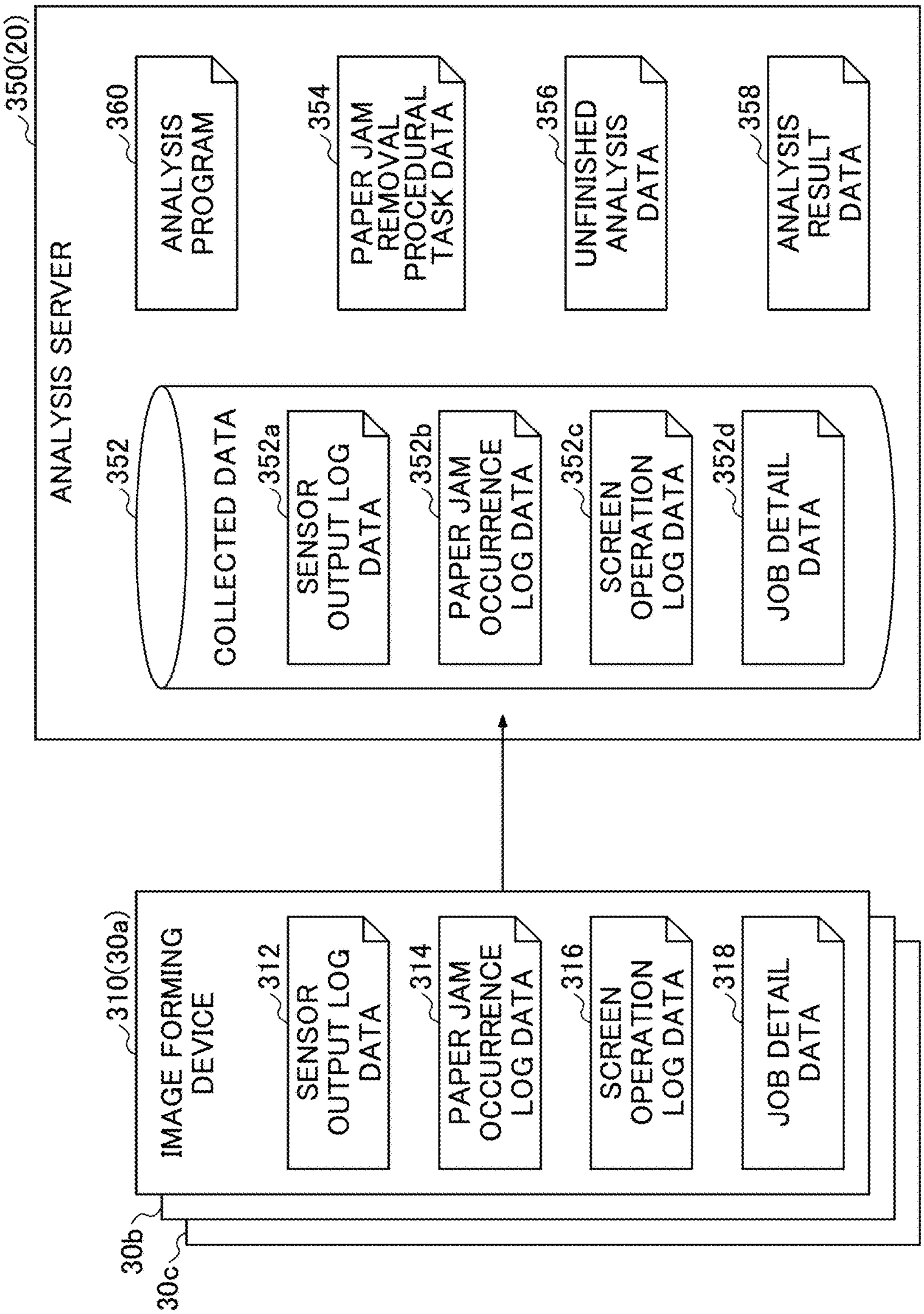
FIG. 4 is a diagram that illustrates a data structure used in the device usage information analysis system according to an embodiment.

The overall structure of the device usage information analysis system 10 of the present embodiment and the hardware structure of each device constituting the device usage information analysis system 10 have been described above. Following this, the data structure 300 used in the device usage information analysis system 10 will be described below with reference to the block diagram illustrated in FIG. 4. Note that FIG. 4 shows a data structure 310 on an image forming device (including a multi-function device 30 and a printer 32, hereinafter referred to as "image forming device 30") and a data structure 350 on an analysis server 20.

First, the data stored on the image forming device 30 for analysis will be explained with reference to FIG. 4. FIG. 4 shows a sensor output log data 312, a paper jam occurrence log data 314, a screen operation log data 316, and job detail data 318, constituting the data structure 310 on the image forming device 30. Every time a paper jam occurs in the image forming device 30, at least these pieces of data are saved in the HDD 109 or a non-volatile memory of the multi-function device 30, at least from the time the paper jam occurred until the paper jam removal tasks are completed.

The sensor output log data 312 is data associated with on one or multiple sensors provided in the image forming device 30 for detecting paper jam removal tasks that are suitable for a paper jam that occurred. More preferably, the sensor output log data 312 is not exactly one or multiple raw sensor data as collected from one or multiple sensors. Instead, the sensor output log data 312 is, or includes, task log data that is gained by converting one or multiple raw sensor data collected from one or multiple sensors, respectively, and shows each task that the user performed on the image forming device 30 (for example, opening the cover, opening the tray, etc.). Information that shows a task includes, for example, the type of a corresponding sensor, the output value of the sensor, and the time at which the output value changed. For example, an event having a predetermined timestamp indicating that the output value of the left/right cover open/close sensor changed from "OFF" to "ON" may be recorded.

The paper jam occurrence log data 314 includes paper jam occurrence information about paper jams that have occurred in the image forming device 30. The paper jam occurrence information includes information about the time (for example, date and time) each paper jam occurred, and information (for example, paper jam code) that indicates one or both of the type of the paper jam, and the location where the paper jam occurred.

The screen operation log data 316 includes data that indicates each operation performed by the user via an input device (software keys and hardware keys on the touch screen of operating panel 140) included in the image forming device 30. Each task corresponds to guidance that is output from the output device (for example, operating panel 140) included in the image forming device 30, and that includes instructions on tasks for removing paper jam. The information to indicate each operation may include information identifying the screen, information about the button operated, information about the time the operation was performed, and so forth.

The job detail data 318 includes data that indicates, for example, the details of the job that was in progress when a paper jam occurred in the image forming device 30. The details of a job may include information such as setting items applied to the job (such as printing side, which specifies whether the job is executed in single-sided printing or double-sided printing, paper type, paper size, etc.), job settings details showing the values of these setting items, and information about the time the job was executed.

Also illustrated in FIG. 4 is the data stored on the analysis server 20 for analysis. FIG. 4 shows, as a data structure 350 on the analysis server 20, data 352 ("collected data") collected from one or multiple image forming devices (30*a* to 30*c*), paper jam removal procedural task data 354, unfinished analysis data 356, and analysis result data 358. Note that the analysis server 20 stores an analysis program 360 for analyzing the tasks that the user performs when removing a paper jam in the image forming device 30. These data and programs are stored in the HDD 204 or non-volatile memory of the analysis server 20.

The collected data 352 includes sensor output log data 352*a*, paper jam occurrence log data 352*b*, screen operation log data 352*c*, and job detail data 352*d*, collected from one or multiple image forming devices 30 (30*a* to 30*c*) described above. These data are stored in each image forming device 30 when a paper jam occurs, transmitted from each image forming device 30 to the analysis server 20 at a predetermined timing (which may be scheduled, for example, as once a day), and stored therein.

The paper jam removal procedural task data 354 is defined per paper jam code, and describes one task or a series of procedural tasks that the operator should perform when a paper jam of a predetermined paper jam code occurs, in order to remove the paper jam. The procedural tasks that are determined from the sensor output log data 352*a* and screen operation log data 352*c* pertaining to the occurrence of a predetermined paper jam and that the operator actually performed (tasks performed), and one or more procedural tasks that are set forth in the paper jam removal procedural task data 354 and that the operator should perform (tasks required) are compared against each other, so that whether the tasks for removal of paper jam were performed appropriately can be determined.

The unfinished analysis data 356 is incomplete data that is temporarily stored while the collected data 352 is being analyzed by the analysis program 360. The analysis result data 358 is generated as a result of analysis by the analysis program 360. The analysis result data 358 may be tabular data that holds analysis results as numerical values, or the analysis result data 358 may be converted into a graph format so that analysis results are presented in the form of graphs.

Figure 5:
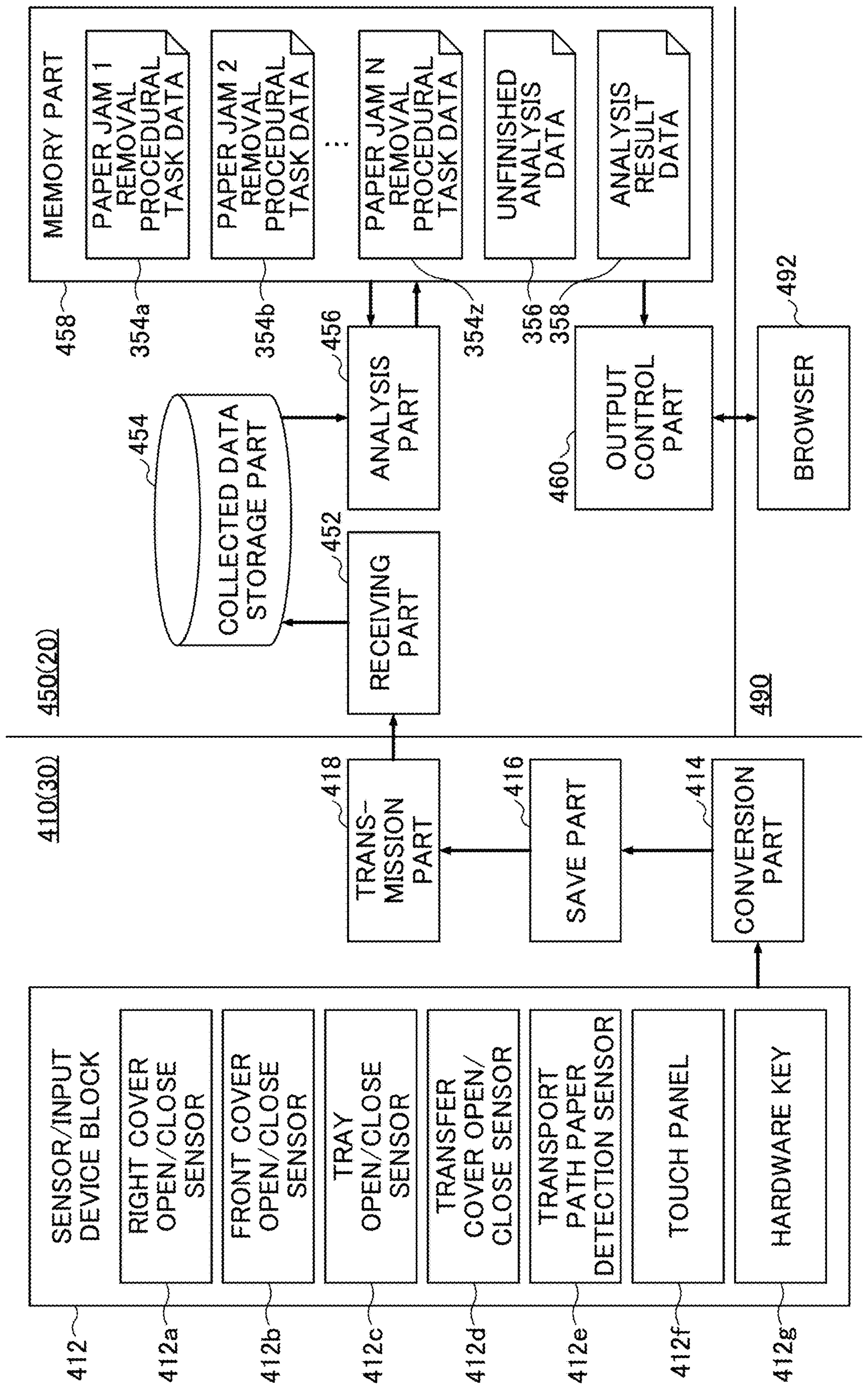
FIG. 5 is a functional block diagram that illustrates the device usage information analysis system according an embodiment.

Following this, a functional structure 400 of the device usage information analysis system 10 will be described below with reference to the function block diagram illustrated in FIG. 5. Note that FIG. 5 shows the boundaries between devices, with a function block 410 implemented on the image forming device 30, a function block 450 implemented on the analysis server 20, and a function block 490 implemented on the terminal 90.

First, the function block 410 on the image forming device 30 will be explained with reference to FIG. 5. As illustrated in FIG. 5, the function block 410 on the image forming device 30 includes a sensor/input device block 412, a conversion part 414, a save part 416, and a transmission part 418.

The sensor/input device block 412 includes: one or multiple sensors 412*a* to 412*e* for detecting, upon the occurrence of a paper jam, tasks performed for removal of the paper jam; and a touch panel 412*f* and hardware keys 412*g*, which function as input devices that accept input operations according to instructions on paper jam removal tasks in response to the occurrence of the paper jam. One or multiple sensors 412*a* to 412*e* include at least one sensor that is selected from the group consisting of: one or multiple cover open/close sensors; one or multiple tray open/close sensors; and one or multiple transport path paper detection sensors. In the embodiment illustrated in FIG. 5, one or multiple sensors 412*a* to 412*e* include one or multiple cover open/close sensors 412*a*, 412*b*, 412*d*, one or multiple tray open/close sensors 412*c*, and one or multiple transport path paper detection sensors 412*e*.

The conversion part 414 converts one or multiple raw sensor data output from one or multiple sensors 412*a* to 412*e* into task log data. The task log data corresponds to the items to be compared against the paper jam removal procedural task data 354, and shows each task that has been performed on the image forming device 30. The conversion part 414 further converts the data input from each input device (touch panel 412*f* and hardware keys 412*g*) into screen operation log data 316. The screen operation log data 316 corresponds to the items to be compared against the paper jam removal procedural task data 354, and shows each screen operation that has been performed on the image forming device 30. Instead of one or multiple raw sensor data, the task log data obtained by the conversion part 414 by way of conversion may be saved and transmitted as sensor output log data. By this means, the data capacity for retaining log data for analyzing paper jam removal tasks and transmission traffic can be reduced significantly.

When a paper jam occurs, the save part 416 saves information about the jam (for example, its type/location, the time of occurrence, etc.) as paper jam occurrence log data 314. When a paper jam occurs, the save part 416 also stores sensor output log data 312 (task log data), which spans from the time the paper jam occurs to the time the paper jam is removed, in the memory area, in association with paper jam occurrence information. Furthermore, when a paper jam occurs, the save part 416 saves screen operation log data 316. The screen operation log data 316, also spanning from the time the paper jam occurs to the time the paper jam is removed, shows each operation that is performed via the touch panel 412*f* and hardware keys 412*g*. The save part 416 further saves job detail data 318, which shows the details of the job that is being executed when the paper jam occurs.

The transmission part 418 transmits the paper jam occurrence log data 314, sensor output log data 312, screen operation log data 316, and job detail data 318, saved in the save part 416 in response to the occurrence of a paper jam, to the analysis server 20, at appropriate timings. The timing for transmitting these data may be scheduled as appropriate, such as every hour, once a day, once every two days, once a week, when the device is powered on, when the device is shut down, when the remaining capacity falls below a certain threshold, and so forth.

Continuing with reference to FIG. 5, the function block 450 on the analysis server 20 will be described. The function block 450 on the analysis server 20 illustrated in FIG. 5 includes a receiving part 452, a collected data storage part 454, an analysis part 456, a memory part 458, and an output control part 460.

The receiving part 452 receives the paper jam occurrence log data 314, sensor output log data 312, screen operation log data 316, and job detail data 318 transmitted from one or multiple image forming devices 30, and stores them in the collected data storage part 454. Note that the details of the data stored in the collected data storage part 454 are omitted in FIG. 5.

In response to from instructions the user/analyst, the analysis part 456 analyzes the sensor output log data (preferably, screen operation log data 352*c*) about one or multiple image forming devices 30, stored in the collected data storage part 454. To be more specific, the analysis part 456 compares the paper jam removal procedural task data 354, corresponding to respective paper jam occurrence information, against the sensor output log data 352*a* received (preferably, screen operation log data 352*c*), thereby generating a task analysis result. The task analysis result here may show statistical data of one or both of procedural errors that occur, and the time that is required, per task or per multiple tasks for removal of a predetermined paper jam in multiple image forming devices 30. The analysis part 456 also analyzes the job detail data 352*d* and paper jam occurrence log data 352*b* for the multiple image forming devices 30, and generates an aggregated result. Here, the aggregated results may show statistics of occurrence of paper jams per item of job settings. The analysis part 456 may analyze the screen operation log data 352*c*, with the job detail data 352*d* and paper jam occurrence log data 352*b*. Note that the details of the analysis results and aggregated result will be described later.

The memory part 458 stores the paper jam removal procedural task data 354*a* to 354*z* described above, for each predetermined paper jam (each paper jam being identified by a unique paper jam code). The memory part 458 also stores unfinished analysis data 356 and analysis result data 358, generated by the analysis part 456.

The output control part 460 exerts control such that a task analysis result is prepared and output (for example, sent out, displayed, etc.) based on paper jam removal procedural task data 354 associated with paper jam occurrence information, and sensor output log data 352*a*. The output control part 460 may be provided by a web server function in a particular embodiment. The output control part 460 outputs a response (for example, an HTTP response), which describes the display screen, in response to a request (for example, an HTTP request) from the browser 492 on the terminal 90. This allows the analyst to view the analysis results on the browser 492.

Note that, with the embodiment illustrated in FIG. 5, the analysis server 20 has been described as a web server that provides a graphical user interface to an external terminal 90. However, this embodiment is by no means limiting; in other embodiments, the analysis function may be implemented as a desktop computer application, for example. In that case, the output control part 460 serves as a means for controlling display on the display of computer.

Note that each component illustrated in FIG. 5 may be implemented as the CPU 101 or CPU 201 reads programs from a non-volatile memory device such as the ROM 102*a*, the HDD 109, the ROM 202, or the HDD 204, and loads them into a work space such as the RAM 102*b* or the RAM 203. Also, in the embodiment described above, the analysis server 20 and the image forming device 30 have been described as being separate devices, but the present invention is not limited to this either. In other embodiments, an analysis function that targets one or multiple image forming devices 30 of the analysis server 20 may be provided in either one or multiple image forming devices 30. In other words, depending on the embodiment, either one or multiple image forming devices 30 may constitute the information processing device.

Figure 6:
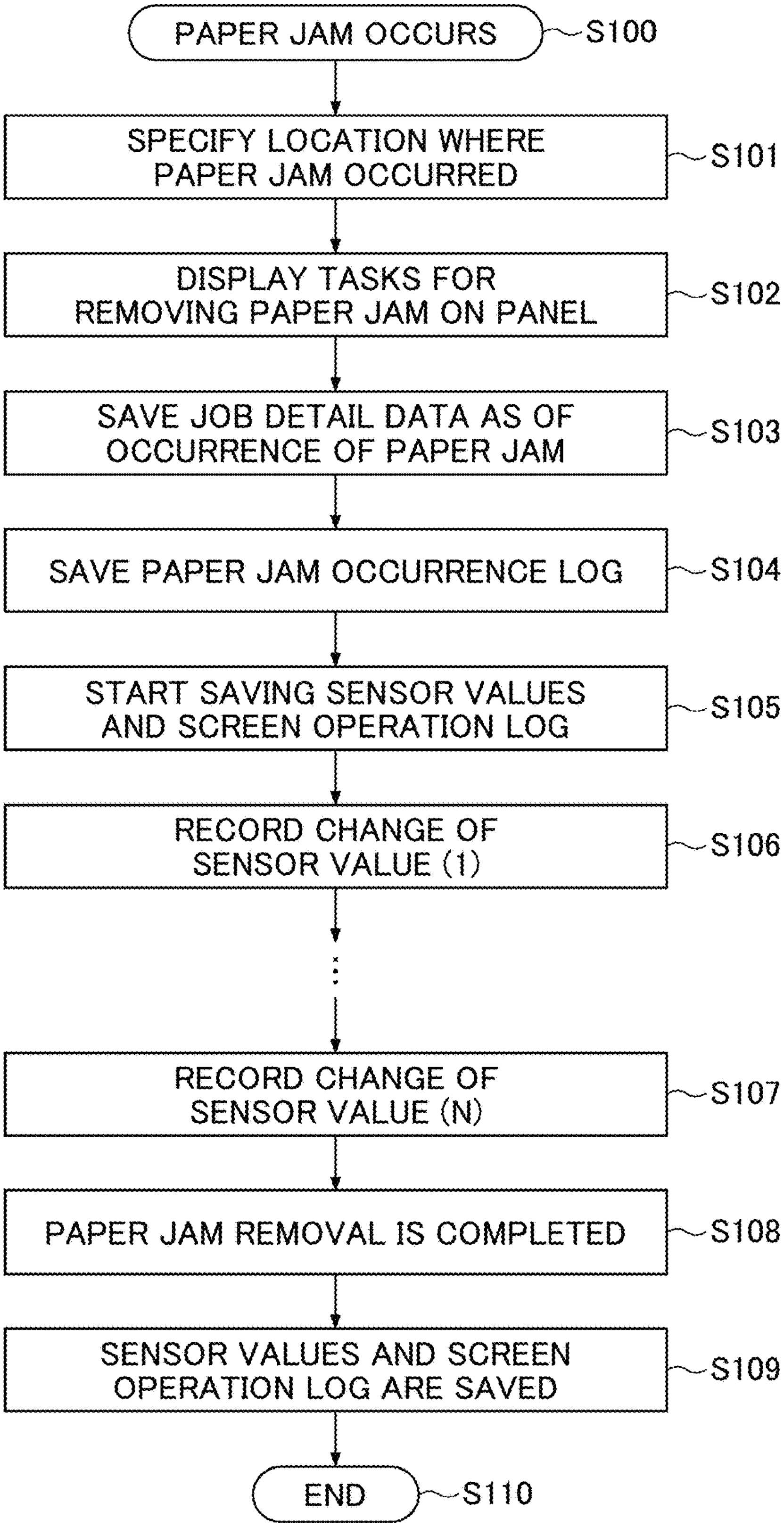
FIG. 6 is a flowchart that illustrates a data saving process that the image forming device according an embodiment performs when a paper jam occurs.

FIG. 6 is a flowchart that illustrates the process for saving data when a paper jam occurs, which is executed by the image forming device 30 according to the present embodiment. The process illustrated in FIG. 6 starts from step S100, for example, every time a paper jam occurs. In step S101, in response to the occurrence of a paper jam, the processor of the image forming device 30 identifies the location where the paper jam occurred, from the values of various sensors such as transport path paper detection sensor 412*e* and the open/closer detection sensors 212*a* to 212*d*. In step S102, the processor displays, on the operating panel 140, the tasks that the operator should perform to remove the paper jam, and that correspond to the location that paper jam occurred.

In step S103, the processor saves the job detail data at the time the paper jam occurred. In step S104, the processor saves the paper jam occurrence log data, including the date and time at which the paper jam occurred, and the paper jam code. In step S105, the processor starts saving the sensor values and screen operation log. By this means, change in sensor values after a paper jam occurs and the time at which these changes occur are saved. Step S105 and steps subsequent to correspond the procedural tasks of paper jam removal that correspond to the location where the paper jam occurred.

In a period after the sensor values and screen operation log start being saved (for example, in step S106), the processor records changes in a predetermined sensor value (1). Subsequently, in accordance with the procedural tasks for removal of paper jam, changes of another value are recorded. In step S107, the processor records yet another sensor value's changes (N).

Figure 7A:
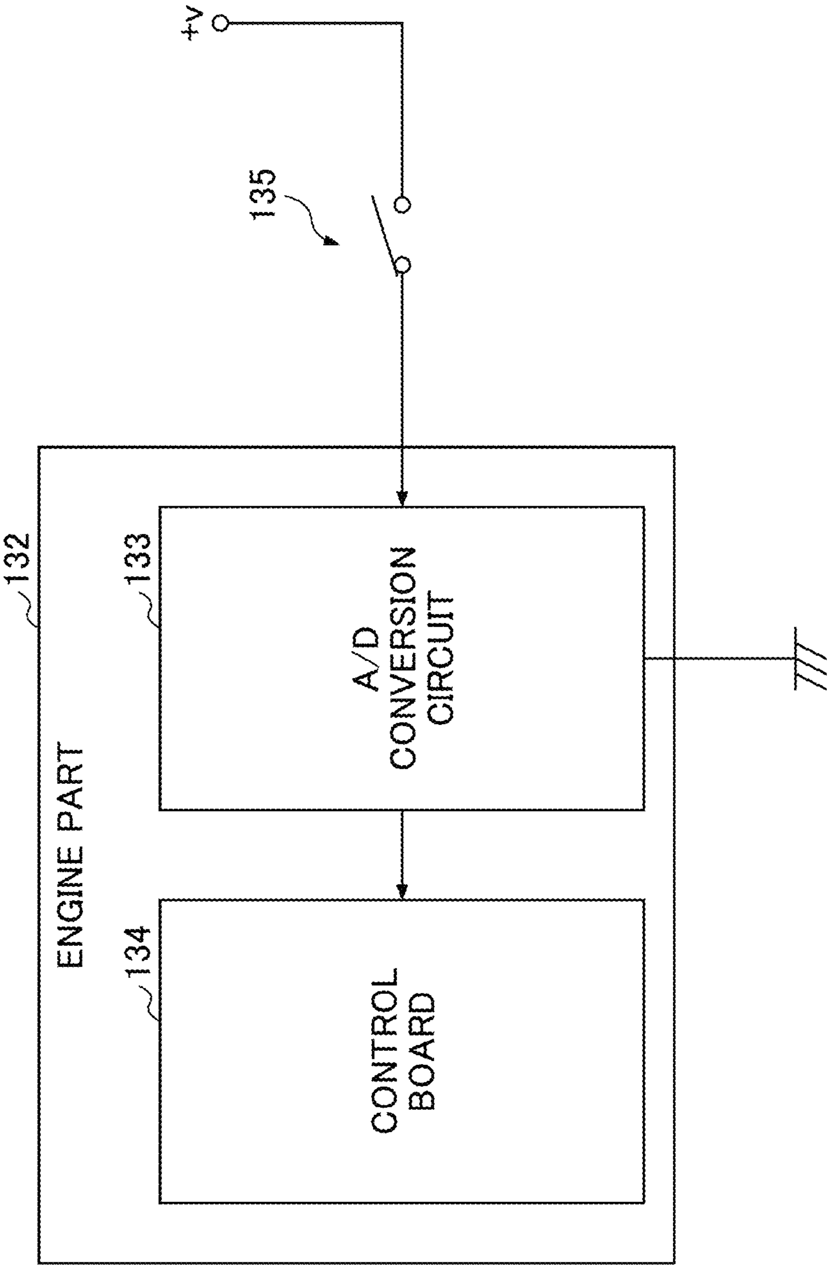
FIG. 7A is a diagram that illustrates a structure for inputting a digital signal from an A/D conversion circuit to a control board, in an engine part of the image forming device, according to an embodiment.
Figure 7B:
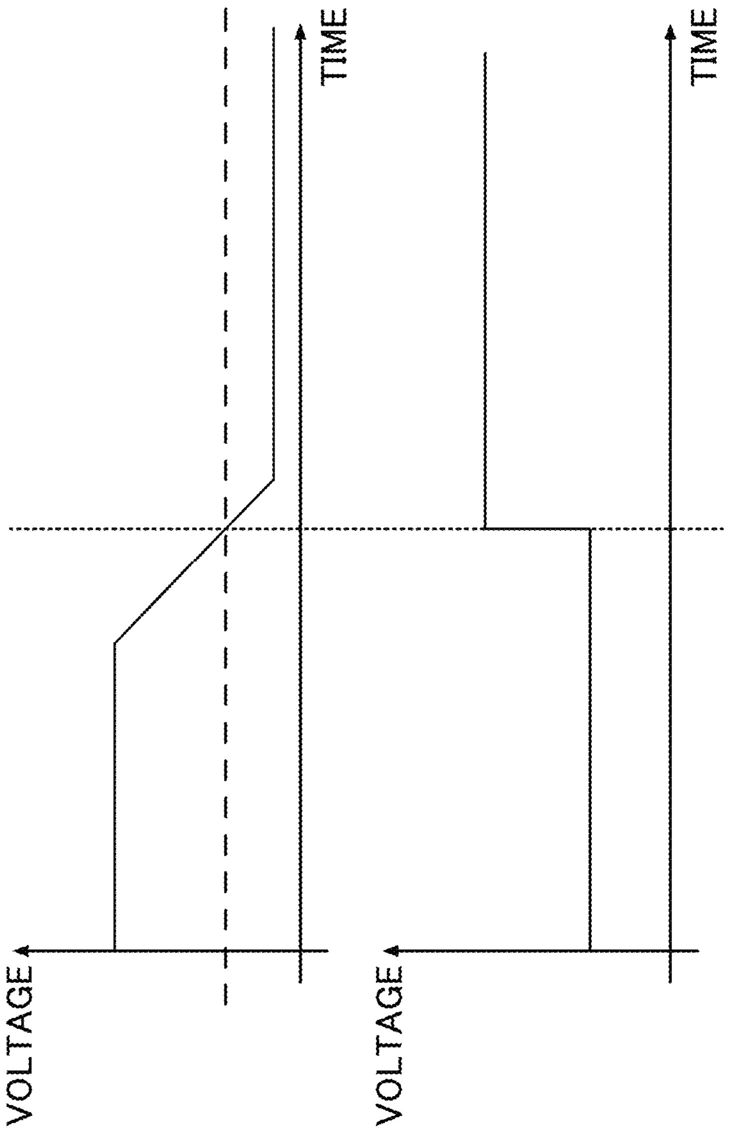
FIG. 7B is a diagram that illustrates a structure for inputting a digital signal from an A/D conversion circuit to a control board, in an engine part of the image forming device, according to an embodiment.

FIG. 7A is a diagram that illustrates a structure for converting a sensor signal in the engine part of the image forming device 30 of the present embodiment into a digital signal in an A/D conversion circuit and inputting the digital signal to a control board. As illustrated in FIG. 7A, the engine part such as the printer part 132 includes an A/D conversion circuit 133, which is provided between a control board 134 and a switch 135. As shown in the upper graph of FIG. 7B, the A/D conversion circuit 133 binarizes an analog signal input from the switch 135, based on a predetermined threshold value indicated by the broken line, converts it into a binary (HIGH/LOW) digital signal such as the one shown in the lower half of the figure, and outputs this digital signal to the control board 134. Looking at the digital signal, for example, the time at which the voltage changes from LOW voltage to HIGH voltage, as indicated by the dotted line, is acquired as a timestamp, and saved as, for example, a time-stamped event where the switch changes from closed to open.

To provide an additional explanation on the tasks for removal of paper jam described above, the user may perform these tasks in different ways, depending on the model of the device. In the first group of models, upon execution of paper jam removal tasks, whether or not the user has a performed a given task in removal of paper jam in proper order is determined on the image forming device 30 side as well, based on outputs of sensors. Depending on the result of this determination, the procedural task to be displayed on the operating panel 140 proceeds to the next step.

Figure 8A:
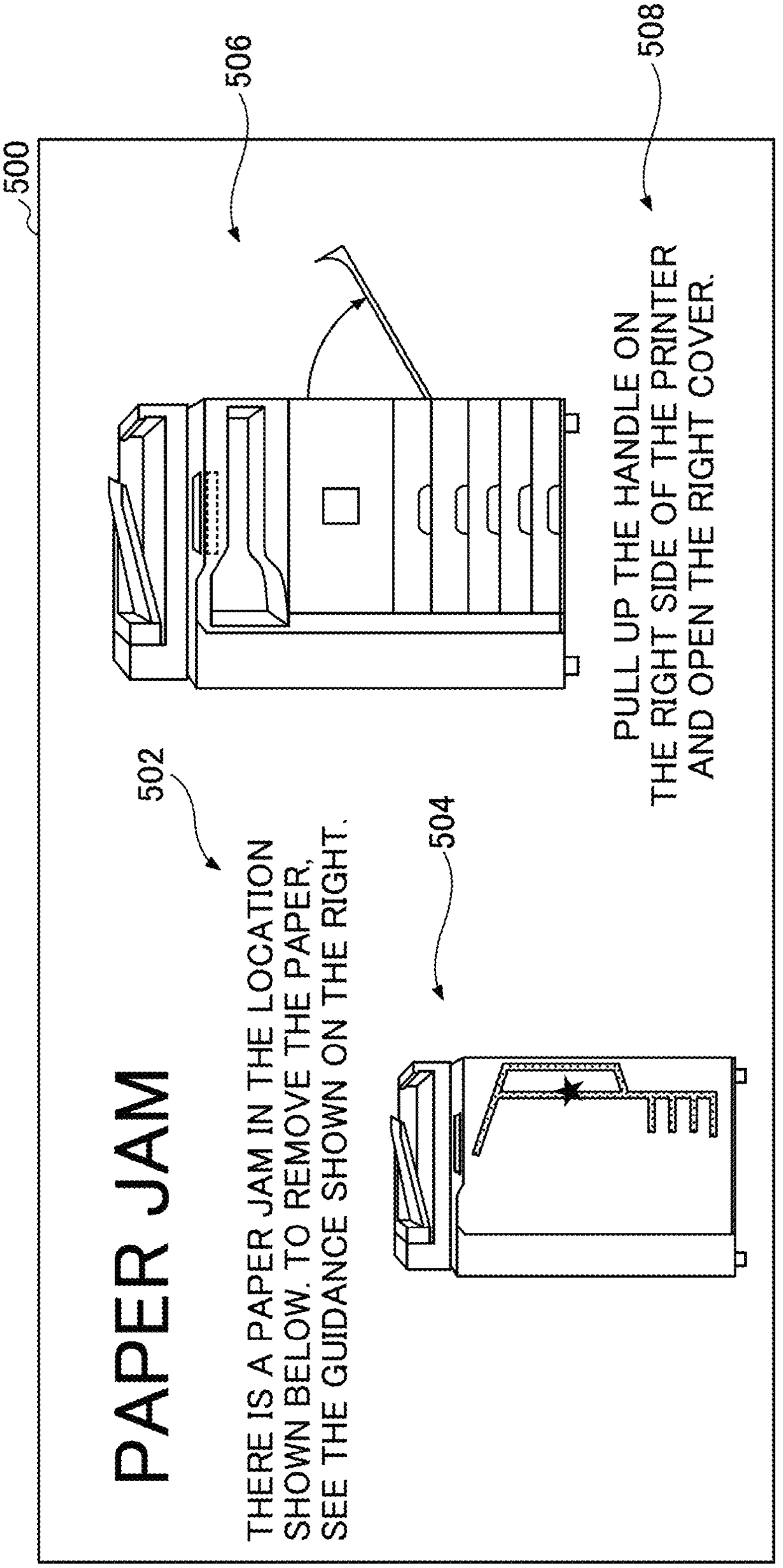
FIG. 8A is a diagram that illustrates tasks for removal of paper jam in the image forming device according to an embodiment.

FIG. 8A illustrates a paper jam removal guidance screen 500 that is displayed on the operating panel 140 of the image forming device 30 and provides instructions on paper jam removal tasks to the user. The paper jam removal guidance screen 500 illustrated in FIG. 8A includes: a message 502, which tells the operator that a paper jam has occurred, and instructs the operator to carry out predetermined procedural tasks; a paper jam location indication 504, which illustrates the location where the paper jam occurred with a star; a guidance illustration 506, which shows instructions on paper jam removal tasks that the operator should perform at this stage in illustration; and a guidance message 508, which explains the instructions in words.

Figure 8B:
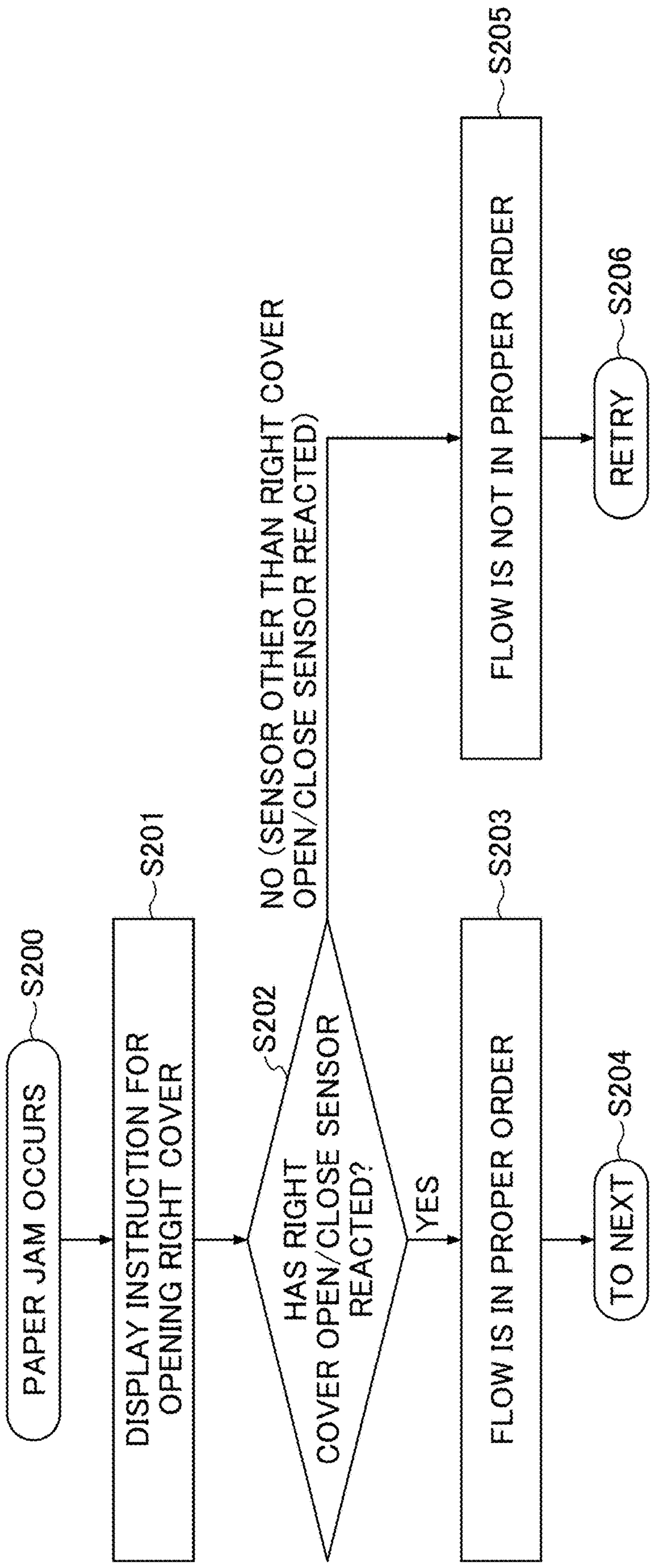
FIG. 8B is a diagram that illustrates tasks for removal of paper jam in the image forming device according to an embodiment.

FIG. 8B shows a flowchart of a process for confirming, upon execution of paper jam removal tasks, that a given task in paper jam removal has been performed in proper order, based on the output of each sensor, and proceeding with the process. The process illustrated in FIG. 8B starts from step S200 in response to the occurrence of a paper jam. In step S201, the processor shows a display on the operating panel 140 that instructs the user to open the right cover, for example. Here, a paper jam removal guidance screen 500 such as the one as illustrated in FIG. 8A is displayed. In step S202, the processor branches the process depending on whether the left/right cover open/close sensor 412*a* has reacted, or whether a sensor other than the left/right cover open/close sensor 412*a* (for example, the front cover open/close sensor 412*b*) has reacted. In step S202, if it is determined that the left/right cover open/close sensor 412*a* has reacted (YES), the process proceeds to step S203. In step S203, it is determined that the flow is in proper order. Then, in step S204, the process proceeds to the next step, where, for example, the content of the paper jam removal guidance screen 500 is changed to the content of the next procedural task. On the other hand, if it is determined in step S202 that a sensor other than the left/right cover open/close sensor has reacted (NO), the process branches to step S205. In step S205, it is determined that the flow is in improper order, and the process is redone in step S206. In this way, when the device belongs in a predetermined group of models, guidance on paper jam removal can be advanced automatically based on reaction of sensors provided in the device.

On the other hand, when the device belong in a different group of models, upon execution of paper jam removal tasks, the above flow linked to sensors is not executed. Instead, for example, press on a button (a software key, a hardware key, etc.) for proceeding to the next step, displayed on the paper jam removal guidance screen 500, is detected, and thereupon the guidance on procedural tasks on the paper jam removal guidance screen 500 of the operating panel 140 moves on to the next step. In this case, screen operation information, including information that identifies the screen being displayed, information about the button pressed on the screen, and the date and time, is recorded as screen operation log data 316.

Referring again to FIG. 6, in step S108, the processor completes the removal of paper jam. In step S109, the processor ends the storage of sensor output log data 312 and screen operation log data 316, including past sensor values collected up until then. In step S110, the processor ends this process.

Figure 9:
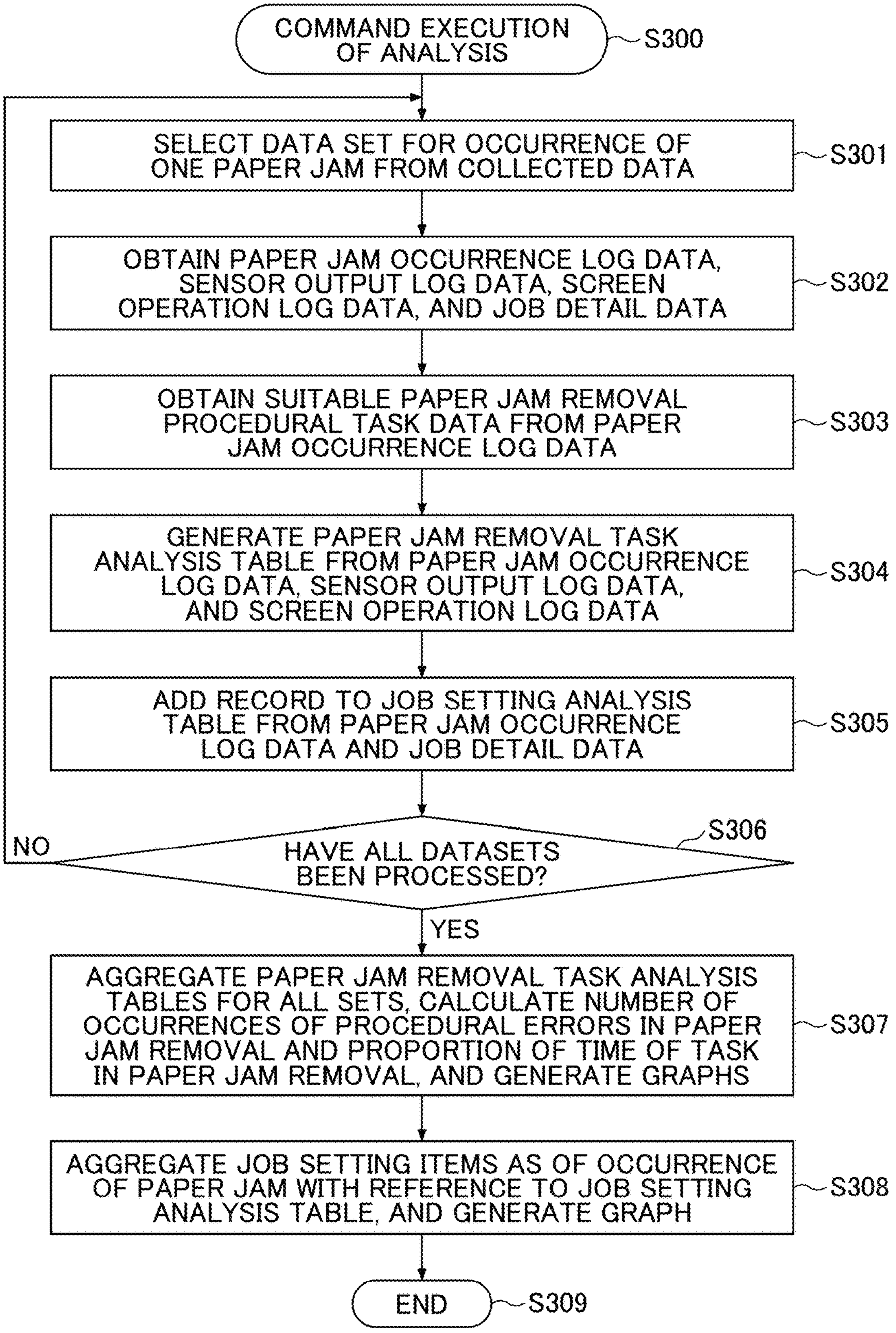
FIG. 9 is a flowchart that illustrates a process of analyzing procedural tasks for removal of paper jam that the analysis server according to an embodiment performs.

Hereinafter, with reference to FIG. 9, the process of analyzing procedural tasks for removal of paper jam, executed by the analysis server 20 according to the present embodiment, will be described in more detail. The process illustrated in FIG. 9 starts from step S300 in response to instructions from the analyst to perform analysis. Note that, when execution of analysis is instructed, the dataset to be analyzed may be specified, or all of the datasets stored up until then may be made subject to analysis.

In step S301, the processor of the analysis server 20 selects, from among the datasets collected in the collected data storage part 454, a set of data (a set of interest) pertaining to one occurrence of paper jam that is going to be analyzed. In step S302, through the analysis part 456, the processor obtains the sensor output log data 352*a*, paper jam occurrence log data 352*b*, screen operation log data 352*c*, and job detail data 352*d* pertaining to the set of interest. In step S303, through the analysis part 456, the processor reads and obtains the paper jam removal procedural task data 354, which describes one or multiple procedural tasks for removal of paper jam, for the set of interest, from the paper jam occurrence log data 314, particularly based on the paper jam code included in the paper jam occurrence log data 314.

In step S304, through the analysis part 456, the processor generates a paper jam removal task analysis table, for the set of interest, from the paper jam occurrence log data 352*b*, the sensor output log data 352*a*, and the screen operation log data 352*c*. To be more specific, in step S304, the analysis part 456 compares the paper jam removal procedural task data 354 according to the paper jam code against the sensor output log data and screen operation log data 352*c*. The contents of the paper jam removal task analysis table are filled in, and unfinished analysis data 356 is provided.

FIG. 10A illustrates the data structure of the paper jam removal task analysis table generated by the analysis server 20 according to the present embodiment. The field "Task" in FIG. 10A shows one or multiple procedural tasks for removal of paper jam (required tasks), which are set forth in the paper jam removal procedural task data 354. The field "Task log" is filled with tasks performed based on sensor output log data 352*a* and screen operation log data 352*c*, and, for example, tasks/events such as "left/right cover open/close sensor ON (OFF→ON)," which indicates change of the output value of the right cover open/close sensor from "OFF" to "ON," are retained. The field "Task result" shows whether the content of the "Task" field and the content of the "Task log" field match or do not match. The field "Time elapsed" holds the time that has elapsed since the paper jam occurred, which is determined from the timestamp affixed to each event's log. Note that the task "3. Open the transfer cover" has a duplicate record because the task failed once, as shown in the task result field. The paper jam removal task analysis table illustrated in FIG. 10A is generated for each set of interest (each occurrence of paper jam). Among the tasks given in FIG. 10A, 1 to 7 are records that correspond to tasks detected based on sensor outputs. "8. Reprint (screen operation)" is a record detected based on screen and button operations, and is a record corresponding to screen operations.

Note that FIG. 10A shows an example in which one or multiple tasks for removing a paper jam are ser forth as a series/sequence of tasks in the paper jam removal procedural task data 354. In the example illustrated in FIG. 10A, the order in which the right cover and tray are opened is fixed. If these tasks are performed in the reverse order, both tasks are evaluated as a failure. On the other hand, there may be instances in which opening the right cover and tray in the reverse order may be acceptable. In that case, tasks not performed strictly according to instructions may be evaluated as failures, or tasks performed in the reverse order may be deemed as acceptable and not evaluated as failures. If tasks performed in the reverse order are not evaluated as failures, for example, in the paper jam removal procedural task data 354, the task "Open the right cover" and the task "Open the tray" may be given equal priority in order, and the order of tasks may be defined only if the tasks must be performed in proper order for evaluation.

Referring again to FIG. 9, in step S305, using the analysis part 456, the processor adds records to the job setting analysis table, from the paper jam occurrence log data 352*b* and job detail data 352*d*.

FIG. 10B illustrates the data structure of the job setting analysis table generated by the analysis server 20 according to the present embodiment. The field "Paper jam code" illustrated in FIG. 10B holds the paper jam codes included in the paper jam occurrence log data 352*b*. The field "Date/time of occurrence" holds the date/time-related information included in the paper jam occurrence log data 352*b*. Fields such as "Setting: tray," "Setting: paper size," and "Setting: printing side" hold the values of respective job setting items included in the job detail data 352*d*. Every time a paper jam occurs, one record is added to the job setting analysis table illustrated in FIG. 10B.

Referring back to FIG. 9, in step S306, whether all datasets have been processed is determined. If it is determined in step S306 that the processing of all datasets has not been completed yet (NO), the process returns to step S301, the set of interest is switched to the next set, and the process continues. On the other hand, if it is determined in step S306 that the processing of all datasets has been completed (YES), the process proceeds to step S307.

Figure 11A:
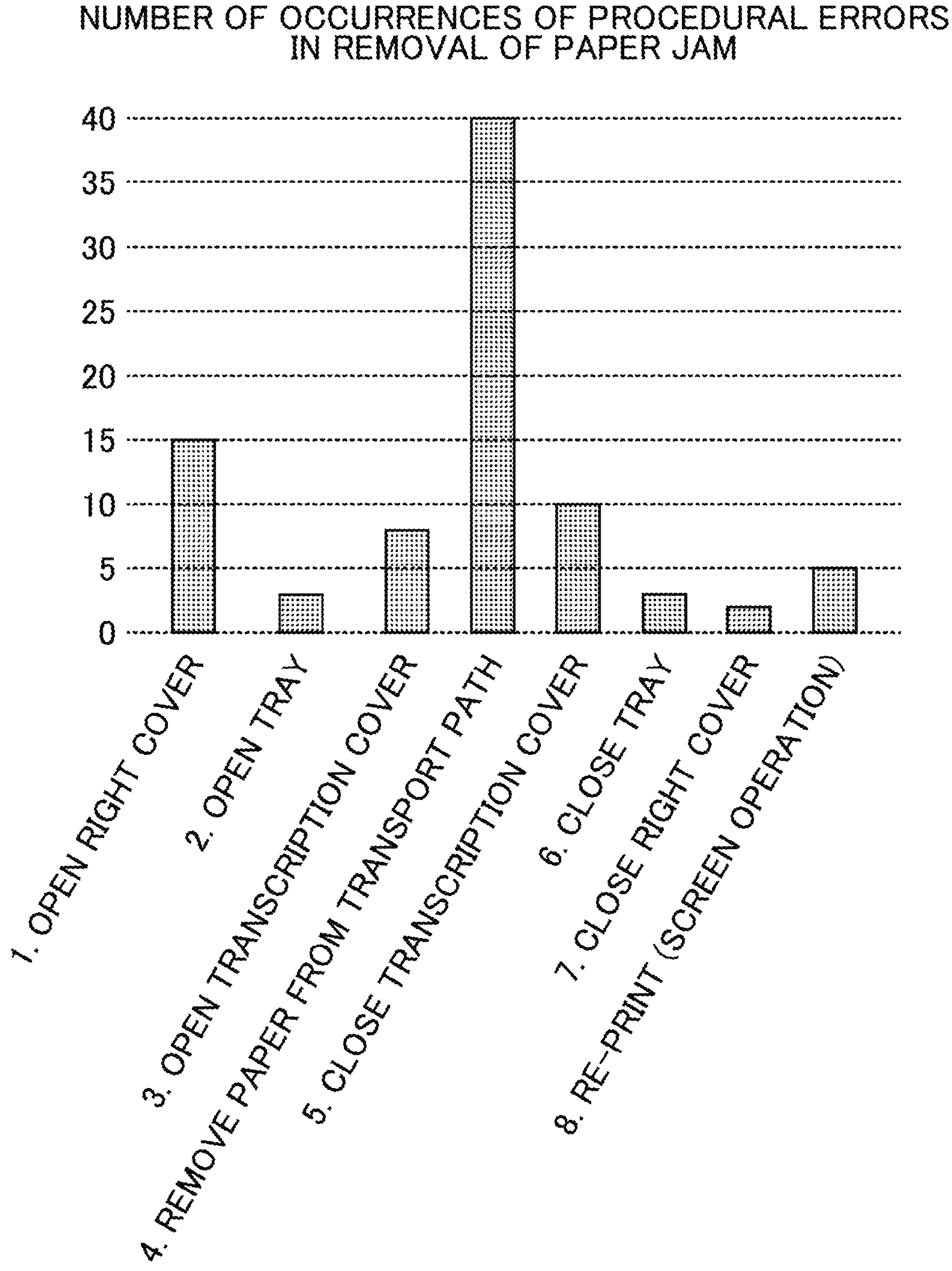
FIG. 11A shows a graph that represents an analysis result generated by the analysis server according an embodiment.
Figure 11B:
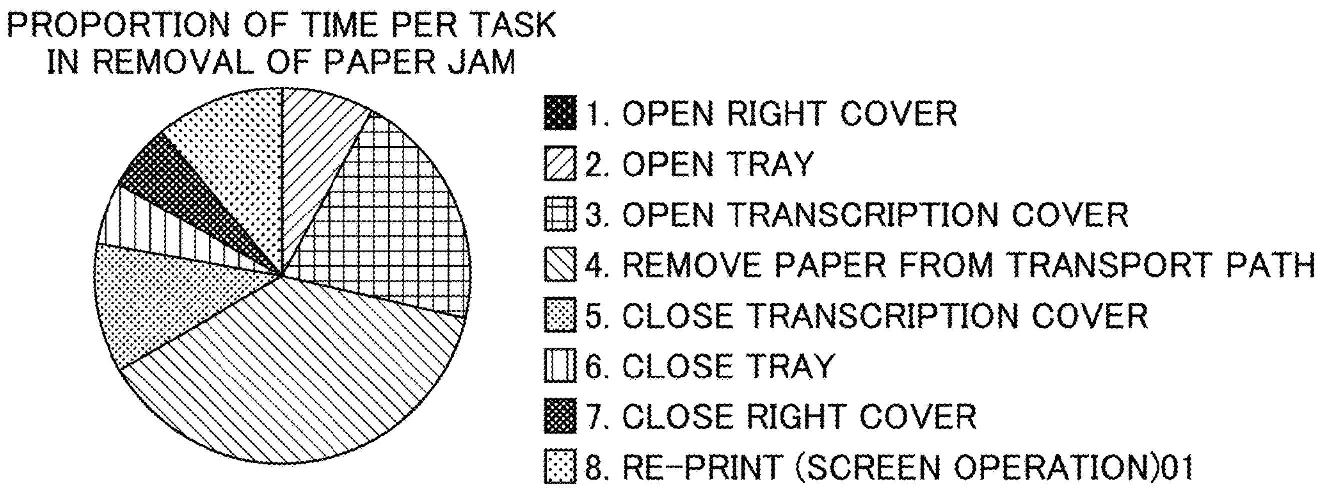
FIG. 11B shows a graph that represents an analysis result generated by the analysis server according an embodiment.

In step S307, the processor aggregates the paper jam removal task analysis tables of all sets (for example, per specific paper jam code) and generates task analysis results. The task analysis results here may be generated in a graph format, for example. FIG. 11A and FIG. 11B illustrate graphs that show task analysis results. For example, a graph of the numbers of errors occurring per task, showing the numbers of procedural errors in paper jam removal per task as a histogram (statistics of the numbers of errors occurring per task), as illustrated in FIG. 11A, and a graph of average processing times per task, showing the average time required for each task (statistics) in paper jam removal in a pie chart, as illustrated in FIG. 11B, can be provided as task analysis results. Referring to FIG. 11A, the number of errors occurring per task can be determined by calculating the number of errors (shown by the symbol "x") in the "Task result" field in the paper jam removal task analysis table illustrated in FIG. 10A for each task, and aggregating these figures over multiple jam-occurrence sets. Referring to FIG. 11B, the proportion of average time each task in paper jam removal takes can be determined by calculating the difference from the previous required task, namely the entry in the "Time elapsed" field for the previous task (the record of the most recent previous task if the previous task was not an error, or the record of the task before that if the previous task was an error) in the paper jam removal task analysis table illustrated in FIG. 10A as the time required for each task, and aggregating these figures over multiple jam-occurrence sets.

Note that the task analysis results shown in FIG. 11A and FIG. 11B are generated for each specific model and for each specific paper jam code, for example. Also, the graphs illustrated in FIG. 11A and FIG. 11B are both examples of task analysis results. Although given in graph format, the task analysis results may obviously be given as tabular data, or given in different types of graphic representation (for example, the histogram of FIG. 11A may be shown as a pie chart that illustrates the proportion of the numbers of occurrences).

Figure 11C:
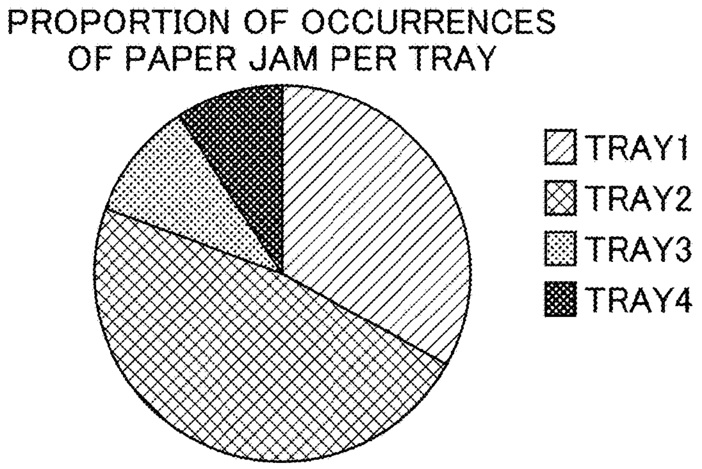
FIG. 11C shows a graph that represents an analysis result generated by the analysis server according an embodiment.

Referring back to FIG. 9, in step S308, the processor references the job setting analysis table, aggregates the job setting items at the time of paper jam occurrence, and generates an aggregated result. The aggregate result here may be generated in graph format, for example. FIG. 11C is an example in which the aggregated result is shown in graph format. As illustrated in FIG. 11C, the aggregated result may be presented in a graph of the proportion of paper jam occurrences per job, which shows the proportion (statistics) of the number of paper jam occurrences per job setting value. Referring to FIG. 11C, the proportion of the number of paper jam occurrences per job setting value can be calculated over multiple sets of paper jam occurrences, for each value in fields pertaining to settings and subject to analysis (for example, the field "Setting: tray") in the job setting analysis table illustrated in FIG. 10B.

Note that the aggregated results illustrated in FIG. 11C may also be generated for each specific model and specific paper jam code, for example. Furthermore, the graph illustrated in FIG. 11C is only an example of the aggregated result. Although given in graph format, the aggregated result may obviously be given as tabular data, or given as a graph in which figures are aggregated by focusing on a different item of settings (for example, a pie chart of the proportion of paper jam occurrences for double-sided printing and single-sided printing may be prepared), or given in different types of graphic representation.

In step S309, this process ends.

Thus, according to the embodiment described above, it is possible to provide an information processing device, an analysis system, an image forming device, an analysis method, and a program, whereby, for example, the tasks that the operator of an image forming device performs to remove a paper jam in the image forming device can be analyzed.

In particular, by using, as reference, task analysis results determined based on procedural task data associated with paper jam occurrence information and based on sensor output log data, inefficient parts in jam removal operations can be estimated, so that the person designing the image forming devices can identify points where improvement is needed. In particular, by calculating statistics on the number of occurrences of procedural errors, it is possible to understand in which tasks procedural errors occur. Also, by calculating the statistics of the time required for each step, it is possible to understand how much time is required for each step from the time a paper jam occurs to the time paper jam is removed. Furthermore, by referencing aggregated results prepared based on paper jam occurrence log data and job detail data, it is possible to know in what job settings (paper type, paper size, printing side, etc.) paper jams tend to occur.

Each function of the embodiment described above can be implemented by one or more processing circuits. "Processing circuit" as used herein refers to a processor programmed to perform a variety of function by software such as a processor implemented by an electronic circuit, or refers to a device designed to perform the functions described herein such as an application-specific integrated circuit (ASIC), a digital signal processor (DSP), a field programmable gate array (FPGA), and other existing circuit modules.

The group of devices described in the above embodiment represents only of one of multiple computing environments for implementing the embodiment disclosed herein. In one embodiment, the analysis server may include multiple computing devices such as a computer cluster. The computing devices may be configured to communicate with each other via a communication link of choice, including a network, shared memory, and so forth, to perform the processes disclosed herein.

In addition, the terminal, analysis server, and image forming device herein can be configured to share the processing steps disclosed herein (for example, those of FIG. 6 and FIG. 9) in various combinations. For example, a process performed by a given unit may be performed by the image forming device. Similarly, the functions of a given unit may be implemented the analysis server. Furthermore, elements such as the terminal, analysis server, and image forming device may be gathered one system or may be provided as multiple separate devices.

Examples of the present invention include the following:

<1> An information processing device including: a receiving part configured to receive: paper jam occurrence information about a paper jam that has occurred in an image forming device; and sensor output log data associated with one or a plurality of sensors provided in the image forming device to detect paper jam removal tasks performed in response to occurrence of the paper jam; a memory part configured to store procedural task data, in which one or a plurality of procedural tasks for removing the paper jam are described; and an output control part configured to output a task analysis result obtained based on: the procedural task data associated with the paper jam occurrence information; and the sensor output log data.

<2> The information processing device according to <1>, in which the sensor output log data includes task log data that is gained by converting one or a plurality of raw sensor data collected from the one or plurality of sensors such that the task log data indicates each task performed on the image forming device.

<3> The information processing device according to <1> or <2>, in which:

the receiving part is further configured to receive screen operation log data that indicates each operation performed on an input device of the image printing device according to guidance, including instructions on tasks for removing the paper jam, the guidance being output via an output device of the image forming device; and the task analysis result is further obtained based on: the procedural task data associated with the paper jam occurrence information; and the screen operation log data.

<4> The information processing device according to any one of <1> to <3>, in which:

the information processing device makes a plurality of image forming devices subject to analysis;

the information processing device further includes an analysis part configured to generate the task analysis result for the plurality of image forming devices by comparing the procedural task data associated with the paper jam occurrence information, against the sensor output log data, for each of the plurality of imaging devices; and the task analysis result shows statistics of at least one of occurrence of procedural errors, or time that is required, per task or per predetermined number of tasks for removal of a predetermined paper jam in the plurality of image forming devices.

<5> The information processing device according to any one of <1> to <4>, in which:

the information processing device makes a plurality of image forming devices subject to analysis;

the receiving part is further configured to receive job detail data that indicates details of a job being executed upon the occurrence of the paper jam in the image forming device;

the information processing device further includes an analysis part configured to analyze the job detail data and the paper jam occurrence information for each of the plurality of imaging devices and generate an aggregated result; and the aggregated result shows statistics of occurrence of jams per item of job settings.

<6> The information processing device according to any one of <1> to <5>, in which:

the paper jam occurrence information includes at least one of type or location of the paper jam, and time of the occurrence of the paper jam; and the sensor output log data includes information collected from at least one sensor selected from the group of sensors of the image forming device, consisting of: one or a plurality of cover open/close sensors; one or a plurality of tray open/close sensors; and one or a plurality of transport path paper detection sensors.

<7> The information processing device according to any one of <1> to <6>, in which the information processing device is one of the image forming device or a server connected to the image forming device via a network.

<8> An analysis system including:

an image forming apparatus with one or a plurality of sensors that are configured to detect jam removal tasks performed in response to occurrence of a paper jam;

a receiving part configured to receive: paper jam occurrence information about the paper jam that has occurred;

a memory part configured to store procedural task data, in which one or a plurality of procedural tasks for removing the paper jam are described; and an output control part configured to output a task analysis result obtained based on: the procedural task data associated with the paper jam occurrence information; and sensor output log data.

<9> The analysis system according to <8>, further including: a conversion part configured to convert the one or plurality of raw sensor data collected from the one or plurality of sensors, into task log data that indicates each task performed on the image forming device, and the sensor output log data includes the task log data.

<10> An image forming device including:

one or a plurality of sensors configured to detect paper jam removal tasks performed in response to occurrence of a paper jam;

a conversion part configured to convert one or plurality of raw sensor data collected from the one or plurality of sensors, into task log data that indicates each task performed on the image forming device and that corresponds to items to be compared against procedural task data, in which one or a plurality of procedural tasks for removing the paper jam are described;

a save part configured to save the task log data from a time the paper jam occurs until the paper jam is removed; and a transmission part configured to transmit, to the information processing device, sensor output log data, including the task log data saved.

<11> The image forming device according to <10>, further including:

an output device configured to output guidance providing instructions on tasks for removal of the paper jam;

an input device configured to accept an input corresponding to the guidance, and the save part is further configured to save screen operation log data that indicates each operation performed via the input device, and the transmission part is further configured to the screen operation log data.

<12> An analysis method that causes a computer system to:

receive jam occurrence information about a paper jam that has occurred in an image forming device;

receive sensor output log data associated with one or a plurality of sensors provided in the information forming device to detect paper jam removal tasks performed in response to occurrence of the paper jam;

read procedural task data, in which one or a plurality of procedural tasks for removing the paper jam are described; and output a task analysis result obtained based on: the procedural task data associated with the paper jam occurrence information; and the sensor output log data.

<13> A program for causing a computer to function as:

a receiving part configured to receive: paper jam occurrence information about a paper jam that has occurred in an image forming device; and sensor output log data associated with one or a plurality of sensors provided in the image forming device to detect paper jam removal tasks performed in response to occurrence of the paper jam;

a memory part configured to store procedural task data, in which one or a plurality of procedural tasks for removing the paper jam are described; and an output control part configured to output a task analysis result obtained based on: the procedural task data associated with the paper jam occurrence information; and the sensor output log data.

<14> A computer-readable non-transitory recording medium storing therein a program that, when executed on a computer, causes the computer to perform the analysis method of <12>.

Although the present disclosure has been described above based on an embodiment, the present disclosure is by no means limited to the requirements shown in the above embodiment. These requirements can be changed in a variety of ways within the scope of the present disclosure, and can be determined as appropriate according to the mode of implementation.

Related-Art Document

Patent Document

Patent Document 1: Unexamined Japanese Patent Application Publication No. 2022-015778

What is claimed is:

1. An information processing device comprising:

circuitry configured to:

receive paper jam occurrence information about a paper jam that has occurred in each of a plurality of image forming devices;

receive sensor output log data associated with one or a plurality of sensors provided in each of the plurality of image forming devices to detect paper jam removal tasks performed in response to occurrence of the paper jam;

store, in a memory, procedural task data including a series of procedural tasks for removing the paper jam;

make a user performance determination, based on the sensor output log data, whether a user who performs a jam removal operation follows each task of the series of procedural tasks included in the procedural task data;

calculate time data required for each task of the series of procedural tasks based on the sensor output log data;

generate a task analysis result based on the user performance determination and the time data calculated for each task of the series of procedural tasks;

aggregate the task analysis result generated for the plurality of image forming devices; and output the aggregated task analysis result, wherein the aggregated task analysis result shows statistics of at least one of occurrence of procedural errors, or time that is required per task or per predetermined number of tasks for removing paper jams in the plurality of image forming devices.

2. The information processing device according to claim 1, wherein the sensor output log data includes task log data that is gained by converting one or a plurality of raw sensor data collected from the one or plurality of sensors such that the task log data indicates each task performed on each of the plurality of image forming devices.

3. The information processing device according to claim 1, wherein the circuitry is further configured to receive screen operation log data that indicates each operation performed on an input device of each of the plurality of image forming devices according to guidance, including instructions on tasks for removing the paper jam, the guidance being output via an output device of each of the plurality of image forming devices, and wherein the task analysis result is further based on the screen operation log data.

4. The information processing device according to claim 1, wherein the circuitry is further configured to receive job detail data that indicates details of a job being executed upon the occurrence of the paper jam in each of the plurality of image forming devices, and analyze the job detail data and the paper jam occurrence information for each of the plurality of image forming devices to generate the aggregated task analysis result, and wherein the aggregated task analysis result further shows statistics of occurrence of jams per item of job settings.

5. The information processing device according to claim 1, wherein the paper jam occurrence information includes at least one of type or location of the paper jam, and time of the occurrence of the paper jam, and wherein the sensor output log data includes information collected from at least one sensor selected from the group of sensors of the plurality of image forming devices, consisting of:

one or a plurality of cover open/close sensors;

one or a plurality of tray open/close sensors; and one or a plurality of transport path paper detection sensors.

6. The information processing device according to claim 1, wherein the information processing device is one of the plurality of image forming devices or a server connected to the plurality of image forming devices via a network.

7. An analysis method that causes a computer system to:

receive paper jam occurrence information about a paper jam that has occurred in each of a plurality of image forming devices;

receive sensor output log data associated with one or a plurality of sensors provided in each of the plurality of image information forming devices to detect paper jam removal tasks performed in response to occurrence of the paper jam;

read, from a memory, procedural task data including a series of procedural tasks for removing the paper jam are described;

make a user performance determination, based on the sensor output log data, whether a user who performs a jam removal operation follows each task of the series of procedural tasks included in the procedural task data;

calculate time data required for each task of the series of procedural tasks based on the sensor output log data;

generate a task analysis result based on the user performance determination and the time data calculated for each task of the series of procedural tasks;

aggregate the task analysis result generated for the plurality of image forming devices; and output the aggregated task analysis result, wherein the aggregated task analysis result shows statistics of at least one of occurrence of procedural errors, or time that is required per task or per predetermined number of tasks for removing paper jams in the plurality of image forming devices.

8. A computer-readable non-transitory recording medium storing therein a program that, when executed on a computer, causes the computer to perform the analysis method of claim 7.

* * * * *